(12) United States Patent
Woodard (10) Patent No.: US 8,540,877 B2
(45) Date of Patent: Sep. 24, 2013

(54) BALLASTED SEQUENCING BATCH REACTOR SYSTEM AND METHOD FOR TREATING WASTEWATER

(71) Applicant: Siemens Industry, Inc., Alpharetta, GA (US)

(72) Inventor: Steven E. Woodard, Cumberland, ME (US)

(73) Assignee: Siemens Water Technologies LLC, Alpharetta, GA (US)

( * ) Notice: Subject to any disclaimer, the term of this patent is extended or adjusted under 35 U.S.C. 154(b) by 0 days.

(21) Appl. No.: 13/627,757

(22) Filed: Sep. 26, 2012

(65) Prior Publication Data

US 2013/0020254 A1 Jan. 24, 2013

Related U.S. Application Data

(63) Continuation of application No. 12/799,573, filed on Apr. 27, 2010, now abandoned, which is a continuation-in-part of application No. 12/584,545, filed on Sep. 8, 2009, now abandoned, which is a continuation-in-part of application No. 12/008,216, filed on Jan. 9, 2008, now Pat. No. 7,695,623.

(60) Provisional application No. 60/879,373, filed on Jan. 9, 2007, provisional application No. 60/994,553, filed on Sep. 20, 2007.

(51) Int. Cl.
*C02F 3/00* (2006.01)

(52) U.S. Cl.
USPC ........... 210/615; 210/616; 210/620; 210/631; 210/663; 210/670; 210/675; 210/676; 210/679; 210/695; 210/768; 210/787; 210/151; 210/173; 210/194; 210/222; 210/223

(58) Field of Classification Search
USPC ................. 210/615–616, 620, 631, 663, 670, 210/675–676, 679, 695, 768, 787, 15–151, 210/173, 194, 222–223
See application file for complete search history.

(56) References Cited

U.S. PATENT DOCUMENTS

| 438,579 | A | 10/1890 | Faunce et al. |
| 531,183 | A | 12/1894 | Harris |
| 653,010 | A | 7/1900 | Koyl |
| 728,062 | A | 5/1903 | Wilson |

(Continued)

FOREIGN PATENT DOCUMENTS

| DE | 19600647 A1 | 7/1997 |
| EP | 12594 A1 | 6/1980 |

(Continued)

OTHER PUBLICATIONS

Tozer, Hugh G., "Study of Five Phosphorus Removal Processes," The Georgia Operator, vol. 45 No. 1 (Winter 2008).*

(Continued)

*Primary Examiner* — Chester Barry (57) ABSTRACT

A ballasted sequencing batch reactor system for treating wastewater including one or more sequencing batch reactors. A weighting agent impregnation subsystem is configured to mix biological flocs and weighting agent to form weighted biological flocs. A weighting agent recovery subsystem is configured to recover weighting agent from the weighted biological flocs and reintroduce the recovered weighting agent to the weighting agent impregnation subsystem.

19 Claims, 8 Drawing Sheets

(56) References Cited

U.S. PATENT DOCUMENTS

| | | |
|---|---|---|
| 1,064,807 A | 6/1913 | Yost |
| 1,310,461 A | 7/1919 | Williams |
| 1,383,287 A | 7/1921 | Campbell |
| 1,401,288 A | 12/1921 | Sodeau |
| 1,948,080 A | 2/1934 | Thomas |
| 2,065,123 A | 12/1936 | Downes |
| 2,129,267 A | 9/1938 | Fischer |
| 2,232,294 A | 2/1941 | Urbain et al. |
| 2,232,296 A | 2/1941 | Urbain et al. |
| 2,268,461 A | 12/1941 | Nichols |
| 2,326,575 A | 8/1943 | Stearns |
| 2,359,748 A | 10/1944 | Clemens |
| 2,391,494 A | 12/1945 | Walker |
| 2,401,924 A | 6/1946 | Goetz |
| 2,564,515 A | 8/1951 | Vogel |
| 2,597,561 A | 5/1952 | Blind |
| 2,652,925 A | 9/1953 | Vermeiren |
| 2,713,028 A | 7/1955 | Jenks |
| 2,758,715 A | 8/1956 | Fowler |
| 2,825,464 A | 3/1958 | Mack |
| 2,945,590 A | 7/1960 | Stearns |
| 3,066,095 A | 11/1962 | Hronas |
| 3,080,264 A | 3/1963 | Zimmie |
| 3,142,638 A | 7/1964 | Blaisdell et al. |
| 3,228,878 A | 1/1966 | Moody |
| 3,350,302 A | 10/1967 | Demeter et al. |
| 3,575,852 A | 4/1971 | Hughes |
| 3,617,561 A | 11/1971 | Fanselow |
| 3,622,461 A | 11/1971 | Wagner et al. |
| 3,627,678 A | 12/1971 | Marston et al. |
| 3,676,337 A | 7/1972 | Kolm |
| 3,690,454 A | 9/1972 | Bekhtle et al. |
| 3,693,795 A | 9/1972 | Robinson et al. |
| 3,697,420 A | 10/1972 | Blaisdell et al. |
| 3,767,351 A | 10/1973 | Blaser |
| 3,819,589 A | 6/1974 | Fauke et al. |
| 3,856,666 A | 12/1974 | Yashima et al. |
| 3,886,064 A | 5/1975 | Kosonen |
| 3,887,457 A | 6/1975 | Marston et al. |
| 3,920,543 A | 11/1975 | Marston et al. |
| 3,929,632 A | 12/1975 | Buriks et al. |
| 3,929,635 A | 12/1975 | Buriks et al. |
| 3,950,319 A | 4/1976 | Schmidt et al. |
| 3,951,807 A | 4/1976 | Sanderson |
| 3,959,133 A | 5/1976 | Fulton |
| 3,983,033 A | 9/1976 | de Latour |
| 4,024,040 A | 5/1977 | Phalangas et al. |
| 4,025,432 A | 5/1977 | Nolan et al. |
| 4,033,864 A | 7/1977 | Nolan et al. |
| 4,046,681 A | 9/1977 | Marston et al. |
| 4,066,991 A | 1/1978 | Marston et al. |
| 4,089,779 A | 5/1978 | Neal |
| 4,110,208 A | 8/1978 | Neal |
| 4,139,456 A | 2/1979 | Yabuuchi et al. |
| 4,142,970 A | 3/1979 | von Hagel et al. |
| 4,151,090 A | 4/1979 | Brigante |
| 4,153,559 A | 5/1979 | Sanderson |
| 4,167,480 A | 9/1979 | Mach |
| 4,176,042 A | 11/1979 | Fahlstrom |
| 4,190,539 A | 2/1980 | Besik |
| 4,193,866 A | 3/1980 | Slusarczuk et al. |
| 4,204,948 A | 5/1980 | Wechsler et al. |
| 4,274,968 A | 6/1981 | Grutsch et al. |
| 4,290,898 A | 9/1981 | von Hagel et al. |
| 4,297,484 A | 10/1981 | Quinlan |
| 4,320,012 A | 3/1982 | Palm et al. |
| 4,339,347 A | 7/1982 | Quinlan |
| 4,341,657 A | 7/1982 | Quinlan |
| 4,343,730 A | 8/1982 | Becker et al. |
| 4,357,237 A | 11/1982 | Sanderson |
| 4,358,382 A | 11/1982 | Quinlan |
| 4,359,382 A | 11/1982 | Morgan |
| 4,377,483 A | 3/1983 | Yamashita et al. |
| 4,388,195 A | 6/1983 | von Hagel et al. |
| 4,402,833 A | 9/1983 | Bennett et al. |
| 4,454,047 A | 6/1984 | Becker et al. |
| 4,465,597 A | 8/1984 | Herman et al. |
| 4,482,459 A | 11/1984 | Shiver |
| 4,502,958 A | 3/1985 | Sasaki |
| 4,522,643 A | 6/1985 | Quinlan |
| 4,563,286 A | 1/1986 | Johnson et al. |
| 4,579,655 A | 4/1986 | Louboutin et al. |
| 4,588,508 A | 5/1986 | Allenson et al. |
| 4,595,506 A | 6/1986 | Kneer |
| 4,654,139 A | 3/1987 | Baba et al. |
| 4,655,933 A | 4/1987 | Johnson et al. |
| 4,686,035 A | 8/1987 | Estabrook |
| 4,689,154 A | 8/1987 | Zimberg |
| 4,699,951 A | 10/1987 | Allenson et al. |
| 4,735,725 A | 4/1988 | Reischl et al. |
| 4,752,401 A | 6/1988 | Bodenstein |
| 4,765,900 A | 8/1988 | Schwoyer et al. |
| 4,765,908 A | 8/1988 | Monick et al. |
| 4,783,265 A | 11/1988 | Timmons |
| 4,795,557 A | 1/1989 | Bourbigot et al. |
| 4,827,890 A | 5/1989 | Pociask et al. |
| 4,843,105 A | 6/1989 | Reischl et al. |
| 4,849,128 A | 7/1989 | Timmons et al. |
| 4,851,123 A | 7/1989 | Mishra |
| 4,864,075 A | 9/1989 | Thompson et al. |
| 4,872,993 A | 10/1989 | Harrison |
| 4,874,508 A | 10/1989 | Fritz |
| 4,882,064 A | 11/1989 | Dixon et al. |
| 4,921,597 A | 5/1990 | Lurie |
| 4,921,613 A | 5/1990 | Nordberg et al. |
| 4,927,543 A | 5/1990 | Bablon et al. |
| 4,938,876 A | 7/1990 | Ohsol |
| 4,940,550 A | 7/1990 | Watson |
| 4,944,278 A | 7/1990 | Woodard |
| 4,944,279 A | 7/1990 | Woodard |
| 4,956,099 A | 9/1990 | Thompson et al. |
| 4,981,593 A | 1/1991 | Priestley et al. |
| 5,009,791 A | 4/1991 | Lin et al. |
| 5,013,451 A | 5/1991 | Thompson et al. |
| 5,019,274 A | 5/1991 | Thompson et al. |
| 5,023,012 A | 6/1991 | Buchan et al. |
| 5,026,483 A | 6/1991 | Thompson et al. |
| 5,055,194 A | 10/1991 | Goetz et al. |
| 5,064,531 A | 11/1991 | Wang et al. |
| 5,069,783 A | 12/1991 | Wang et al. |
| 5,084,733 A | 1/1992 | Katoh et al. |
| 5,089,120 A | 2/1992 | Eberhardt |
| 5,089,227 A | 2/1992 | Thompson et al. |
| 5,089,619 A | 2/1992 | Thompson et al. |
| 5,112,494 A | 5/1992 | Yan |
| 5,112,499 A | 5/1992 | Murray et al. |
| 5,149,438 A | 9/1992 | Hebert |
| 5,187,326 A | 2/1993 | Shirai |
| 5,234,603 A | 8/1993 | Potts |
| 5,266,200 A | 11/1993 | Reid |
| 5,298,168 A | 3/1994 | Guess |
| 5,310,642 A | 5/1994 | Vargas et al. |
| 5,369,072 A | 11/1994 | Benjamin et al. |
| 5,377,845 A | 1/1995 | Hamen et al. |
| 5,383,539 A | 1/1995 | Bair et al. |
| 5,395,527 A | 3/1995 | Desjardins |
| 5,397,476 A | 3/1995 | Bradbury et al. |
| 5,462,670 A | 10/1995 | Guess |
| 5,545,330 A | 8/1996 | Ehrlich |
| 5,560,493 A | 10/1996 | Perry |
| 5,593,590 A | 1/1997 | Steyskal |
| 5,595,666 A | 1/1997 | Kochen et al. |
| 5,596,392 A | 1/1997 | Danzuka |
| 5,597,479 A | 1/1997 | Johnson |
| 5,616,250 A | 4/1997 | Johnson et al. |
| 5,637,221 A | 6/1997 | Coyne |
| 5,693,461 A | 12/1997 | Bagchi et al. |
| 5,702,809 A | 12/1997 | Tixier et al. |
| 5,730,864 A | 3/1998 | Delsalle et al. |
| 5,731,134 A | 3/1998 | Honan et al. |
| 5,770,091 A | 6/1998 | Binot et al. |
| 5,779,908 A | 7/1998 | Anderson et al. |
| 5,800,717 A | 9/1998 | Ramsay et al. |
| 5,805,965 A | 9/1998 | Tsuda et al. |

| Patent No. | Date | Inventor(s) |
|---|---|---|
| 5,840,195 A | 11/1998 | Delsalle et al. |
| 5,856,072 A | 1/1999 | Leone et al. |
| 5,893,355 A | 4/1999 | Glover et al. |
| 5,925,290 A | 7/1999 | Hills |
| 5,976,375 A | 11/1999 | Dorica et al. |
| 5,976,771 A | 11/1999 | Kosugi et al. |
| 6,010,631 A | 1/2000 | Delsalle et al. |
| 6,030,761 A | 2/2000 | Taguchi et al. |
| 6,093,318 A | 7/2000 | Saho et al. |
| 6,099,738 A | 8/2000 | Wechsler et al. |
| 6,149,014 A | 11/2000 | Mankosa et al. |
| 6,151,467 A | 11/2000 | Yamaguchi |
| 6,160,976 A | 12/2000 | Karakama et al. |
| 6,185,393 B1 | 2/2001 | Karakama et al. |
| 6,210,587 B1 | 4/2001 | Vion |
| 6,210,588 B1 | 4/2001 | Vion |
| 6,221,253 B1 | 4/2001 | Fukase et al. |
| 6,221,262 B1 | 4/2001 | MacDonald et al. |
| 6,228,269 B1 | 5/2001 | Cort |
| 6,228,565 B1 | 5/2001 | Ohzeki et al. |
| 6,251,576 B1 | 6/2001 | Taguchi et al. |
| 6,277,285 B1 | 8/2001 | Vion |
| 6,290,849 B1 | 9/2001 | Rykaer et al. |
| 6,379,549 B1 | 4/2002 | LePoder et al. |
| 6,383,370 B1 | 5/2002 | Keever et al. |
| 6,386,781 B1 | 5/2002 | Gueret |
| 6,406,624 B1 | 6/2002 | DeVos |
| 6,423,485 B1 | 7/2002 | Yamada et al. |
| 6,432,303 B1 | 8/2002 | Chesner et al. |
| 6,447,686 B1 | 9/2002 | Choi et al. |
| 6,472,132 B1 | 10/2002 | Yamada et al. |
| 6,485,652 B1 | 11/2002 | Le Poder et al. |
| 6,517,714 B2 | 2/2003 | Streat |
| 6,576,145 B2 | 6/2003 | Conaway et al. |
| 6,613,232 B2 | 9/2003 | Chesner et al. |
| 6,645,386 B1 | 11/2003 | Moreau et al. |
| 6,689,277 B2 | 2/2004 | Streat |
| 6,692,173 B2 | 2/2004 | Gueret |
| 6,706,467 B2 | 3/2004 | Howe et al. |
| 6,740,245 B2 | 5/2004 | Johnson |
| 6,759,018 B1 | 7/2004 | Arno et al. |
| 6,783,679 B1 | 8/2004 | Rozich |
| 6,811,885 B1 | 11/2004 | Andriessen et al. |
| 6,824,692 B2 | 11/2004 | Binot et al. |
| 6,832,691 B2 | 12/2004 | Miles et al. |
| 6,875,351 B2 | 4/2005 | Arnaud |
| 6,896,815 B2 | 5/2005 | Cort |
| 6,902,678 B2 | 6/2005 | Tipton |
| 6,919,031 B2 | 7/2005 | Blumenschein et al. |
| 6,923,901 B2 | 8/2005 | Leffler et al. |
| 6,960,294 B2 | 11/2005 | Arnaud |
| 6,966,993 B2 | 11/2005 | Binot |
| 6,968,138 B2 | 11/2005 | Akutsu |
| 7,001,525 B2 | 2/2006 | Binot et al. |
| 7,083,715 B2 | 8/2006 | Binot |
| 7,153,431 B2 | 12/2006 | Daugherty |
| 7,160,448 B2 | 1/2007 | Johnson |
| 7,210,581 B2 | 5/2007 | Robinson et al. |
| 7,244,362 B2 | 7/2007 | Binot |
| 7,255,793 B2 * | 8/2007 | Cort .......................... 210/695 |
| 7,276,165 B2 | 10/2007 | Morgoun |
| 7,309,435 B2 | 12/2007 | Rozich |
| 7,311,841 B2 | 12/2007 | Binot et al. |
| 7,323,108 B1 | 1/2008 | Garbett et al. |
| 7,407,582 B2 | 8/2008 | Sun |
| 7,407,593 B2 | 8/2008 | Frederick, Jr. et al. |
| 7,438,817 B2 | 10/2008 | Nagghappan et al. |
| 7,449,105 B2 | 11/2008 | Hastings |
| 7,476,324 B2 | 1/2009 | Ciampi et al. |
| 7,494,592 B2 | 2/2009 | Deskins |
| 7,563,366 B2 | 7/2009 | Sun |
| 7,601,261 B2 | 10/2009 | Palacios Donaque |
| 7,608,190 B1 | 10/2009 | Banerjee et al. |
| 7,625,490 B2 | 12/2009 | Cort |
| 7,648,637 B1 | 1/2010 | Sauvignet et al. |
| 7,648,638 B2 | 1/2010 | Essemiani et al. |
| 7,651,620 B2 | 1/2010 | Vion |
| 7,678,278 B2 | 3/2010 | Binot et al. |
| 7,686,079 B2 | 3/2010 | Gamache et al. |
| 7,686,960 B2 * | 3/2010 | Cort .......................... 210/666 |
| 7,691,261 B2 | 4/2010 | Deskins |
| 7,691,269 B2 | 4/2010 | Cort |
| 7,695,623 B2 | 4/2010 | Woodard et al. |
| 7,695,630 B2 | 4/2010 | de Guevara |
| 7,704,390 B2 | 4/2010 | Leffler et al. |
| 7,704,399 B2 | 4/2010 | Condit |
| 7,722,843 B1 | 5/2010 | Srinivasachar |
| 7,729,778 B2 | 6/2010 | Eggers et al. |
| 7,820,025 B2 | 10/2010 | Ciampi et al. |
| 7,820,053 B2 | 10/2010 | Cort |
| 7,820,054 B2 | 10/2010 | Hastings et al. |
| 7,828,976 B2 | 11/2010 | Banerjee et al. |
| 2001/0030160 A1 | 10/2001 | Wechsler et al. |
| 2002/0003115 A1 | 1/2002 | Conaway et al. |
| 2002/0017483 A1 | 2/2002 | Chesner et al. |
| 2002/0030019 A1 | 3/2002 | Keever et al. |
| 2002/0054783 A1 | 5/2002 | Gueret |
| 2002/0088758 A1 | 7/2002 | Blumenschein et al. |
| 2002/0158025 A1 | 10/2002 | Streat |
| 2002/0170816 A1 | 11/2002 | Leffler et al. |
| 2002/0185452 A1 | 12/2002 | Johnson |
| 2002/0190004 A1 | 12/2002 | Wechsler et al. |
| 2003/0082084 A1 | 5/2003 | Cort |
| 2003/0089667 A1 | 5/2003 | Binot et al. |
| 2003/0150817 A1 | 8/2003 | Keever et al. |
| 2003/0222027 A1 | 12/2003 | Streat |
| 2003/0224301 A1 | 12/2003 | Howe et al. |
| 2004/0055959 A1 | 3/2004 | Wechsler et al. |
| 2004/0055961 A1 | 3/2004 | Binot |
| 2004/0060876 A1 | 4/2004 | Tipton |
| 2004/0129642 A1 | 7/2004 | Binot |
| 2004/0144730 A1 | 7/2004 | Binot et al. |
| 2004/0206680 A1 | 10/2004 | Johnson |
| 2004/0213721 A1 | 10/2004 | Arno et al. |
| 2005/0005471 A1 | 1/2005 | Pan |
| 2005/0035030 A1 | 2/2005 | Oder et al. |
| 2005/0045534 A1 | 3/2005 | Kin et al. |
| 2005/0051488 A1 | 3/2005 | Nagghappan et al. |
| 2005/0101719 A1 | 5/2005 | Ishihara |
| 2005/0103719 A1 | 5/2005 | Binot et al. |
| 2005/0131266 A1 | 6/2005 | Carman et al. |
| 2005/0173354 A1 | 8/2005 | Binot et al. |
| 2005/0194311 A1 | 9/2005 | Rozich |
| 2005/0218056 A1 | 10/2005 | Binot |
| 2005/0230299 A1 | 10/2005 | Saho et al. |
| 2005/0258103 A1 | 11/2005 | Cort |
| 2005/0271575 A1 | 12/2005 | Ciampi et al. |
| 2005/0277712 A1 | 12/2005 | Daly |
| 2005/0282144 A1 | 12/2005 | Wechsler et al. |
| 2006/0006114 A1 | 1/2006 | Deskins |
| 2006/0018273 A1 | 1/2006 | Yamada et al. |
| 2006/0108273 A1 | 5/2006 | Perri et al. |
| 2006/0108283 A1 * | 5/2006 | Johnson et al. ............... 210/626 |
| 2006/0138047 A1 | 6/2006 | Morgoun |
| 2006/0175252 A1 * | 8/2006 | Upendrakumar et al. .... 210/603 |
| 2006/0186056 A1 | 8/2006 | Ivan |
| 2006/0213832 A1 | 9/2006 | Hudson et al. |
| 2006/0254770 A1 | 11/2006 | Hou |
| 2006/0270888 A1 | 11/2006 | Carman et al. |
| 2006/0289357 A1 | 12/2006 | Wechsler et al. |
| 2007/0039894 A1 | 2/2007 | Cort |
| 2007/0062883 A1 | 3/2007 | Frederick et al. |
| 2007/0108132 A1 | 5/2007 | de Guevara |
| 2007/0114184 A1 | 5/2007 | Essemiani et al. |
| 2007/0138093 A1 | 6/2007 | Bossler et al. |
| 2007/0163955 A1 | 7/2007 | Sun |
| 2008/0019780 A1 | 1/2008 | Hastings |
| 2008/0073267 A1 | 3/2008 | Cort |
| 2008/0073268 A1 | 3/2008 | Cort |
| 2008/0073270 A1 * | 3/2008 | Smith .......................... 210/616 |
| 2008/0073271 A1 | 3/2008 | Cort |
| 2008/0073278 A1 | 3/2008 | Cort |
| 2008/0073279 A1 | 3/2008 | Cort |
| 2008/0073280 A1 | 3/2008 | Cort |
| 2008/0073281 A1 | 3/2008 | Cort |
| 2008/0073282 A1 | 3/2008 | Cort |
| 2008/0073283 A1 | 3/2008 | Cort |
| 2008/0073284 A1 | 3/2008 | Cort |

| | | | |
|---|---|---|---|
| 2008/0078721 A1 | 4/2008 | Binot et al. | |
| 2008/0135491 A1 | 6/2008 | Cort | |
| 2008/0156709 A1 | 7/2008 | Johnson | |
| 2008/0164183 A1 | 7/2008 | Marston et al. | |
| 2008/0164184 A1 | 7/2008 | Marston et al. | |
| 2008/0203015 A1 | 8/2008 | Marston et al. | |
| 2008/0210613 A1 | 9/2008 | Wechsler et al. | |
| 2008/0217244 A1 | 9/2008 | Gaid | |
| 2008/0257810 A1 | 10/2008 | Sun | |
| 2008/0272065 A1 | 11/2008 | Johnson | |
| 2008/0290030 A1 | 11/2008 | Nagghappan et al. | |
| 2008/0296228 A1 | 12/2008 | Sauvignet et al. | |
| 2008/0314820 A1 | 12/2008 | Prulhiere et al. | |
| 2008/0314830 A1 | 12/2008 | Banerjee et al. | |
| 2009/0047076 A1 | 2/2009 | Hastings | |
| 2009/0050570 A1 | 2/2009 | Sauvignet | |
| 2009/0065404 A1 | 3/2009 | Paspek, Jr. et al. | |
| 2009/0084730 A1 | 4/2009 | Mabille et al. | |
| 2009/0098262 A1 | 4/2009 | Mabille et al. | |
| 2009/0127180 A1 | 5/2009 | Deskins | |
| 2009/0178979 A1 | 7/2009 | Hastings et al. | |
| 2009/0206040 A1 | 8/2009 | Berg et al. | |
| 2009/0218281 A1 | 9/2009 | Sauvignet et al. | |
| 2009/0261037 A1* | 10/2009 | Clifford et al. | 210/614 |
| 2009/0272693 A1 | 11/2009 | Mabille et al. | |
| 2009/0299143 A1 | 12/2009 | Conlon et al. | |
| 2009/0301948 A1 | 12/2009 | Essemiani et al. | |
| 2009/0308815 A1 | 12/2009 | Sauvignet et al. | |
| 2010/0038081 A1 | 2/2010 | Gamache et al. | |
| 2010/0057085 A1 | 3/2010 | Holcomb et al. | |
| 2010/0072142 A1 | 3/2010 | Lean et al. | |
| 2010/0096335 A1 | 4/2010 | Sauvignet et al. | |
| 2010/0101309 A1 | 4/2010 | Klyamkin et al. | |
| 2010/0102006 A1 | 4/2010 | Quevillon | |
| 2010/0155327 A1 | 6/2010 | Woodard et al. | |
| 2010/0213123 A1 | 8/2010 | Marston et al. | |
| 2010/0219372 A1 | 9/2010 | Hook et al. | |
| 2010/0251571 A1 | 10/2010 | Woodard | |
| 2010/0274209 A1 | 10/2010 | Roe et al. | |
| 2011/0036771 A1 | 2/2011 | Woodard | |
| 2011/0147304 A1 | 6/2011 | Sauvignet et al. | |
| 2012/0067824 A1 | 3/2012 | Berg et al. | |

FOREIGN PATENT DOCUMENTS

| | | |
|---|---|---|
| EP | 0087223 A1 | 8/1983 |
| EP | 0139572 A1 | 5/1985 |
| EP | 266098 A2 | 5/1988 |
| EP | 392321 A1 | 10/1990 |
| EP | 392322 A1 | 10/1990 |
| EP | 1244601 B1 | 10/2002 |
| EP | 1785400 A1 | 5/2007 |
| EP | 2165980 A1 | 3/2010 |
| FR | 1411792 A | 9/1965 |
| FR | 2378550 A1 | 8/1978 |
| FR | 2719235 A1 | 11/1995 |
| JP | 07-299495 A | 11/1995 |
| JP | 08-257583 A | 10/1996 |
| JP | 11-169866 A | 6/1999 |
| JP | 2000-233198 A | 8/2000 |
| JP | 2001-170404 A | 6/2001 |
| JP | 2003-010874 A | 1/2003 |
| SU | 1136839 A1 | 1/1985 |
| WO | 9312041 A1 | 6/1993 |
| WO | 9735654 A1 | 10/1997 |
| WO | 9735655 A1 | 10/1997 |
| WO | 9803433 A1 | 1/1998 |
| WO | 9919261 A1 | 4/1999 |
| WO | 9931016 A1 | 6/1999 |
| WO | 0114260 A1 | 3/2001 |
| WO | 0128931 A1 | 4/2001 |
| WO | 0140121 A1 | 6/2001 |
| WO | 0200556 A1 | 1/2002 |
| WO | 0242223 A1 | 5/2002 |
| WO | 2005077835 A1 | 8/2005 |
| WO | 2005087381 A1 | 9/2005 |
| WO | 2006086384 A2 | 8/2006 |
| WO | 2006102362 A2 | 9/2006 |
| WO | 2007059141 A2 | 5/2007 |
| WO | 2007098298 A2 | 9/2007 |
| WO | 2008022192 A2 | 2/2008 |
| WO | 2008039936 A2 | 4/2008 |
| WO | 2008085196 A2 | 7/2008 |
| WO | 2008085197 A1 | 7/2008 |
| WO | 2008086009 A1 | 7/2008 |
| WO | 2008086010 A1 | 7/2008 |
| WO | 2009083346 A1 | 7/2009 |
| WO | 2010027895 A2 | 3/2010 |
| WO | 2010101903 A1 | 7/2010 |
| WO | 2010086249 A1 | 8/2010 |

OTHER PUBLICATIONS www.ingentaconnect.com/content/wef/wefproc/2009/00002009/00000004/art0020 downloaded Dec. 16, 2012.* http://www.envirosim.com/includes/weftec08.htm downloaded Dec. 16, 2012.*

Buchanan et al., "Aerobic Treatment of Wastewater and Aerobic Treatment Units," University Curriculum Development for Decentralized Wastewater Management Aerobic Treatment of Wastewater and Aerobic Treatment Units Buchanan and Seabloom, p. i-v and 1-22, Nov. 2004, [Retrieved on Mar. 9, 2011].

Catlow et al. "Ballasted Biological Treatment Process Removes Nutrients and Doubles Plant Capacity". WEFTEC Conference, (Oct. 2008).

Kolm et al., "High Gradient Magnetic Separation," Scientific American, Nov. 1975, vol. 233, No. 5, 10 pages (unnumbered).

Lubenow et al. "Maximizing Nutrient Removal in an Existing SBR with a Full-Scale BioMag Demonstration". WEFTEC Conference. Date Unknown.

Moody et al. "Beyond Desktop Evaluation: Key Design Criteria for Mixing and Settling of Magnetite-Impregnated Mixed Liquor". WEFTEC Conference 2011.

Raskin et al., "Quantification of Methanogenic Groups in Anaerobic Biological Reactors by Oligonucleotide Probe Hybridization," Applied and Environmental Microbiology, Apr. 1994, vol. 60, No. 4, pp. 1241-1248.

Sakai et al., "A Sewage Treatment Process Using Highly Condensed Activated Sludge with an Apparatus for Magnetic Separation," 1994, Journal of Fermentation and Bioengineering, vol. 78, No. 1, pp. 120-122.

Sakai et al., "Magnetic Forced Sedimentation of Flocs in Activated Sludge Supplemented with Ferromagnetic Powder of Iron Oxide," 1991, Journal of Fermentation and Bioengineering, vol. 71, No. 3, pp. 208-210.

Sakai et al., "Recovery and Reuse of Ferromagnetic Powder Supplemented in Activated Sludge for Magnetic Separation," Dept. of Applied Chemistry, Faculty of Engineering, Utunsonomiya University, Japan, Submitted: Jun. 28, 1991; Accepted: Oct. 22, 1991, pp. 1-11. Japanese language original (pp. 52-56), and translated English language copy (pp. 1-11).

Sakai et al., "Sewage Treatment under Conditions of Balancing Microbial Growth and Cell Decay with a High Concentration of Activated Sludge Supplemented with Ferromagnetic Powder," 1992, Journal of Fermentation and Bioengineering, vol. 74, No. 6, pp. 413-315.

Sakai et al., "Simultaneous Removal of Organic and Nitrogen Compounds in Intermittently Aerated Activated Sludge Process Using Magnetic Separation," 1997, Technical Note Wat. Res., vol. 31, No. 8, pp. 2113-2116.

* cited by examiner

BALLASTED SEQUENCING BATCH REACTOR SYSTEM AND METHOD FOR TREATING WASTEWATER

RELATED APPLICATIONS

This application is a continuation of U.S. patent application Ser. No. 12/799,573, filed on Apr. 27, 2010, which is a continuation-in-part of U.S. patent application Ser. No. 12/584,545, filed Sep. 8, 2009, which is a continuation-in-part of U.S. patent application Ser. No. 12/008,216, filed Jan. 9, 2008, now U.S. Pat. No. 7,695,623, issued Apr. 13, 2010, which claims benefit of and priority to U.S. Provisional Application Ser. No. 60/879,373, filed Jan. 9, 2007, and U.S. Provisional Application Ser. No. 60/994,553, filed Sep. 20, 2007, all of which are incorporated by reference herein.

FIELD OF THE INVENTION

This invention relates to a ballasted sequencing batch reactor (SBR) system and method for treating wastewater.

BACKGROUND OF THE INVENTION

SBR systems are used to treat wastewater. A typical conventional SBR system includes one or more SBRs which contain a large population of microorganisms that ingest contaminants in the influent wastewater to form biological flocs and treat the wastewater. SBR systems typically use four phases to treat wastewater: fill, react, settle, and decant. During the fill phase, the SBR is filled with the influent wastewater and may be aerated, mixed without aeration, or not mixed and not aerated. The react phase involves adding oxygen, mixing, or a combination thereof, to provide treatment by converting biochemical oxygen demand (BOD) to microorganisms to form biological flocs. During the settle phase, the biological flocs formed in the previous phases are allowed settle to the bottom of the SBR to form settled sludge. The decant phase involves slowly decanting the clear water from the settled sludge to provide a treated effluent.

However, during the settling phase of a typical conventional SBR system, the biological flocs are only marginally heavier than water and therefore settle very slowly. Moreover, the solids separation in the settle phase may be unreliable due to many types of settling problems that are caused by: overgrowth of filamentous organisms, viscous bulking caused by the overgrowth of either zoogleal organisms or exocellular polysaccharide material, pin floc, straggler floc, and the like. This may limit the capacity of a conventional SBR system and can compromise the quality of the treated effluent.

BRIEF SUMMARY OF THE INVENTION

This invention features a ballasted sequencing batch reactor system for treating wastewater including one or more sequencing batch reactors. A weighting agent impregnation subsystem is configured to mix biological flocs and weighting agent to form weighted biological flocs. A weighting agent recovery subsystem is configured to recover weighting agent from the weighted biological flocs and reintroduce the recovered weighting agent to the weighting agent impregnation subsystem.

In one embodiment, the system may include a sludge storage tank configured to receive settled sludge from the one or more sequencing batch reactors, store the settled sludge therein, and regulate the flow of settled sludge to weighting agent recovery subsystem. The weighting agent recovery subsystem may include a separator subsystem for separating the weighting agent from the weighted biological flocs. The separator subsystem may include a shear mill. The separator subsystem may include a centrifugal separator. The separator subsystem may include an ultrasonic separator. The separator subsystem may include a shear mill and a wet drum magnetic separator. The separator subsystem may include a shear mill and a centrifugal separator. The separator subsystem may include an ultrasonic separator and a wet drum magnetic separator. The separator subsystem may include an ultrasonic separator and a centrifugal separator. The shear mill may include rotor and a stator, wherein the rotor and/or the stator include slots sized as to optimize separation of weighting agent from the weighted biological flocs. The weighting agent impregnation subsystem may include an impregnation tank and at least one mixer. The capacity of the system may be increased by reducing the duration of a settle phase. The one or more sequencing batch reactors may be configured to decant clear effluent from settled sludge to provide a treated effluent. The weighted biological flocs may enhance the quality of the treated effluent by reducing the concentration of suspended solids and related contaminants therein. The system may include a wasting subsystem for wasting settled sludge from the weighting agent recovery subsystem to control a population of microorganisms in a mixed liquor in the one or more sequencing batch reactors. The capacity of the system may be increased by increasing the concentration of the mixed liquor in the one or more sequencing batch reactors by reducing the amount of settled sludge wasted by a wasting subsystem. The capacity of the system may be increased by reducing the duration of a react phase. The amount of settled sludge wasted by the wasting subsystem may be reduced to increase the concentration of mixed liquor suspended solids for enhancing nitrification and/or de-nitrification of ammonia in the mixed liquid. Nitrification may be enhanced by increasing the amount of dissolved oxygen introduced into the one or more sequencing batch reactors. A coagulant may be added to the one or more sequencing batch reactors for removing phosphorus by precipitation and/or coagulation. A flocculant may be added to the one or more sequencing batch reactors for enhancing settling and thickening of the weighted biological flocs and for providing agglomeration of non-impregnated biological flocs and/or partially impregnated biological flocs with weighted biological flocs. The weighting agent impregnation subsystem may include a venturi mixer/eductor. A majority of the weighting agent may have a particle size less than about 100 µm. A majority of the weighting agent may have a particle size less than about 40 µm. A majority of the weighting agent may have a particle size less than about 20 µm. The weighting agent may include magnetite. The system may include a mixer disposed in each of the one or more sequencing batch reactors for maintaining the suspended solids or the mixed liquor in suspension.

This invention also features a method for treating wastewater using one or more sequencing batch reactors, the method including the steps of: a) receiving influent wastewater in the one or more sequencing batch reactors, b) forming biological flocs in the one or more sequencing batch reactors, c) impregnating weighting agent into the biological flocs to form weighted biological flocs, and d) recovering weighting agent from the weighted biological flocs to reintroduce the weighting agent to step c).

In one embodiment, the method may include the step of separating the weighting agent from the weighted biological flocs. The method may include the step of collecting the weighting agent and recycling the weighting agent to step c). The method may include the step of providing weighting agent in which the majority of the weighting agent has a particle size less than about 100 µm. The method may include the step of providing weighting agent in which the majority of the weighting agent has a particle size less than about 40 µm. The method may include the step of providing weighting agent in which the majority of the weighting agent has a particle size less than about 20 µm. The method may include the step of introducing dissolved oxygen to a population of microorganisms to promote growth of biological flocs in a mixed liquor defined by a concentration of mixed liquor suspended solids. The method may include the step of introducing a flocculant to the mixed liquor to enhance settling and thickening of the weighted biological flocs and to establish agglomeration of non-impregnated biological flocs and/or partially impregnated biological flocs with the weighted biological flocs. The method may include the step of separating and collecting the weighted biological flocs from the mixed liquor in the one or more sequencing batch reactors to provide a secondary effluent and a settled sludge. The method may include the step of recycling the majority of the settled sludge to step b). The method may include the step of decanting the clean effluent from the settled sludge in the one or more sequencing batch reactors to provide a treated effluent. The method may include the step of wasting the remaining settled sludge using a wasting subsystem to control the population of the microorganisms in the mixed liquor. The method may include the step of increasing the capacity of the system by reducing the duration of a settle phase. The method may include the step of enhancing the quality of the treated effluent by reducing suspended solids and related contaminants therein. The method may include the step of wasting settled sludge from the weighting agent recovery subsystem to control a population of microorganisms in a mixed liquor in the one or more sequencing batch reactors. The method may include the step of increasing the capacity of the system by increasing the concentration of the mixed liquor in the one or more sequencing batch reactors by reducing the amount of settled sludge wasted by a wasting subsystem. The method may include the step of increasing the capacity of the system by reducing the duration of a react phase. The method may include the step of reducing the amount of settled sludge wasted by the wasting subsystem to increase the concentration of mixed liquor suspended solids which enhances nitrification and/or de-nitrification of ammonia in the mixed liquid. The method may include the step of enhancing nitrification by increasing the amount of dissolved oxygen introduced into the one or more sequencing batch reactors. The weighting agent may be impregnated into the biological flocs in step b) by mixing the mixed liquor and the biological flocs at a predetermined energy level.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
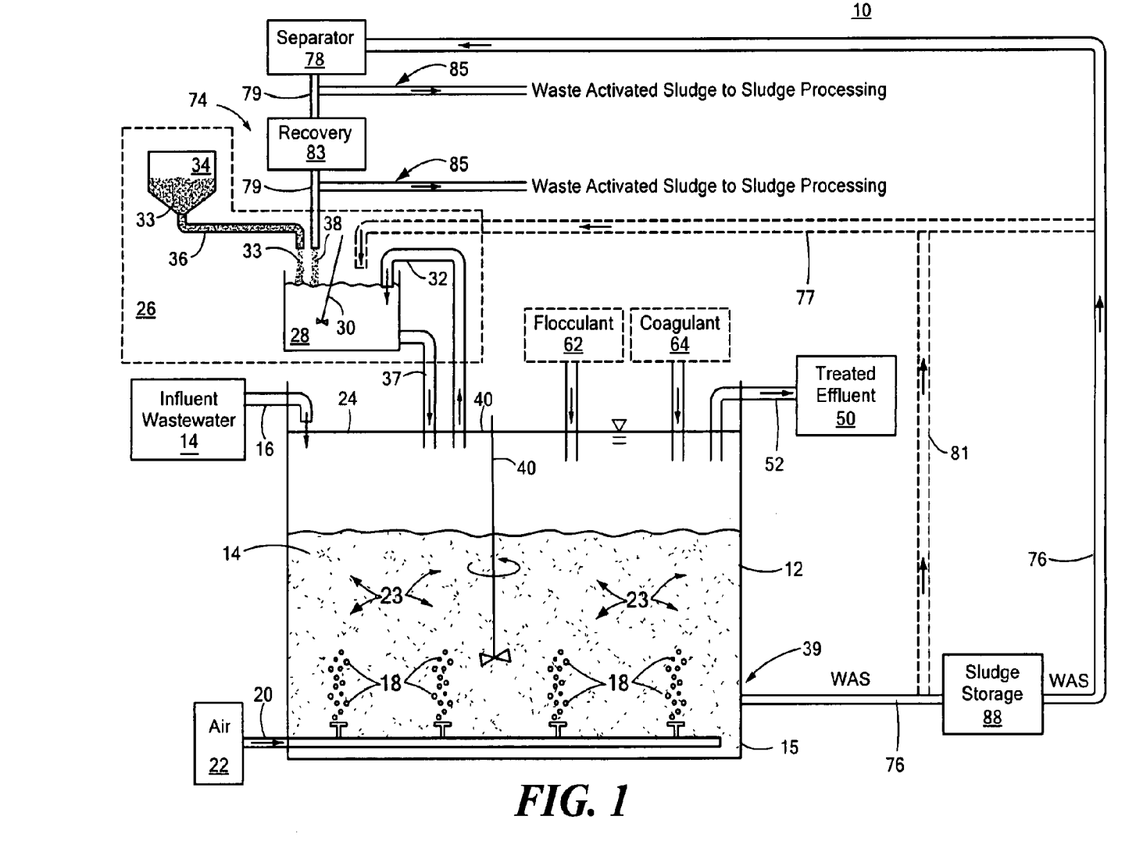
FIG. 1 is a schematic block diagram of one embodiment of the SBR system for treating wastewater in accordance with this invention.

There is shown in FIG. 1, one embodiment of SBR system 10 for treating wastewater of this invention. System 10 includes at least one SBR 12 which receives a flow of influent wastewater 14 by line 16. SBR 12 preferably introduces air bubbles 18 by line 20 exposed to ambient air 22. Air bubbles 18 introduce dissolved oxygen to a population of microorganisms in SBR 12 to promote growth of biological flocs 23 in mixed liquor 24. Mixed liquor 24 as used herein means a combination of influent wastewater 14 and biological flocs 23.

Figure 2:
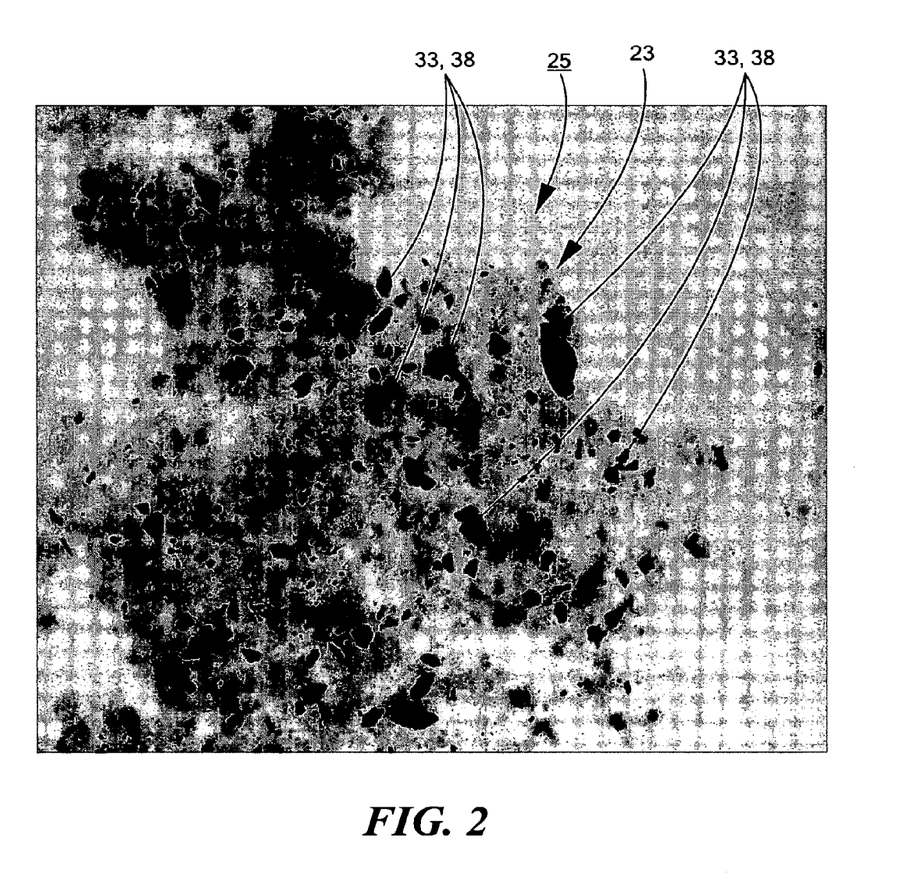
FIG. 2 is a microscopic view showing one example of weighting agent impregnated in biological flocs using the weighting agent impregnation system shown in FIG. 1.

System 10 also includes weighting agent impregnation subsystem 26 which, in one embodiment, includes impregnation tank 28 and mixer 30 which receives mixed liquor 24 from SBR 12 by line 32. In one embodiment, impregnation tank 28 preferably receives virgin weighting agent 33, e.g., from feed hopper 34 by line 36, and/or recycled weighting agent 38 from weighting agent recovery subsystem 74 (discussed below). Weighting agent impregnation subsystem 26 mixes mixed liquor 24 or settled sludge received by line 77 and virgin weighting agent 33 and/or the recycled weighting agent 38 in impregnation tank 28 to impregnate the weighting agent into biological flocs 23 suspended in mixed liquor 24 or settled sludge by line 77 via sludge storage tank 88 and line 76 and/or via lines 76 and 81 to form weighted biological flocs. Mixer 30 utilizes a mixing energy which is sufficient to impregnate the weighting agent into biological flocs suspended in a mixed liquor to form weighted biological flocs. FIG. 2 shows one example of weighting agent 33, 38 impregnated into biological flocs 23 to form weighted biological flocs 25. The weighted biological flocs impregnated with the weighting agent are then sent back to SBR 12, FIG. 1, by line 37.

The weighting agent may be magnetite, or any similar type weighting agent or magnetically separable inorganic material known to those skilled in the art which increases the density of the biological flocs. In one example, the majority of the weighting agent particles may have a size less than about 100

μm. In other examples, the majority of the weighting agent particles may have a size less than about 40 μm, or, the majority of the weighting agent may have a particle size less than about 20 μm.

System 10 also includes weighting agent recovery subsystem 74 which receives settled sludge from bottom 39 of SBR 12 by line 76 typically after the settle and decant phases are complete. Weighting agent recovery subsystem 74 preferably includes separator 78 which recovers the weighting agent from the weighted biological flocs in the settled sludge in line 76 and reintroduces (recycles) the weighting agent to weighting agent impregnation subsystem 26 by line 79. Weighting agent recovery subsystem 74 may include recovery subsystem 83, discussed below.

In one embodiment, system 10 includes sludge storage tank 88 which stores settled sludge output from SBR 12 by line 76 typically after the decant phase is complete.

In one exemplary operation of SBR system 10, SBR 12 is filled with influent wastewater 14 via line 16 and seeded with a large population of microorganisms that ingest contaminants in influent wastewater 14 to form biological flocs 23. During a fill phase, dissolved oxygen via air bubbles 18 may be introduced to mixed liquor 24 to promote growth of biological flocs 23. Once filled, system 10 undergoes a react phase. During the fill and/or react phases, weighting agent impregnation subsystem 26 receives the mixed liquor by line 32, or settled sludge by line 77 via sludge storage tank 88 and line 76 and/or via lines 76 and 81, and impregnates the biological flocs therein with virgin weighting agent 33 and/or recycled weighting agent 38 using mixer 30. The mixed liquor or settled sludge having weighted biological flocs is then sent back to SBR 12 by line 37. The react phase is followed by the settling phase where the weighted biological flocs settle to bottom 39 of SBR 12 to form settled sludge. The times for the fill, react, settle, and decant phases vary as known by those skilled in the art. Then, the clear effluent is decanted by line 52 to provide treated effluent 50. During or after the decant phase, some of the settled sludge at bottom 39 of SBR 12 may be sent to sludge storage tank 88 via line 76. Sludge storage tank 88 stores sludge from SBR 12 and regulates the flow thereof to weighting agent recovery subsystem 74. Weighting agent recovery subsystem 74 then recovers the weighting agent from the weighted biological flocs as discussed above and recycles the weighting agent to weighting agent impregnation subsystem 26 as recovered weighting agent 38.

Because the weighted biological flocs in SBR 12 have a greater specific gravity than non-impregnated biological flocs, they settle faster than non-impregnated biological flocs utilized in a typical conventional SBR system. Thus, the time needed for the settling phase of system 10 is reduced. This alleviates settling problems associated with a conventional SBR system, such as overgrowth of filamentous organisms, viscous bulking caused by the overgrowth of either zoogleal organisms or exocellular polysaccharide material, pin floc, straggler floc, and the like. The result is the capacity of system 10 to treat wastewater may be increased while providing high quality treated effluent 50. Because the time needed in the settling phase is reduced, system 10 may also allow more time for the react phase, which further increases the quality of treated effluent 50. The weighted biological flocs also enhance the quality of the treated effluent by reducing the concentration of suspended solids and related contaminants therein. The weighted biological flocs also facilitate higher mixed liquor suspended solids (MLSS) concentrations. Operating at higher MLSS concentrations provides additional advantages, including additional increased treatment capacity, enhanced nitrogen removal, enhanced phosphorus removal, and the like. Moreover, because weighting agent recovery subsystem 74 recovers and recycles the weighting agent, the operational costs of system 10 are significantly reduced.

Figure 3:
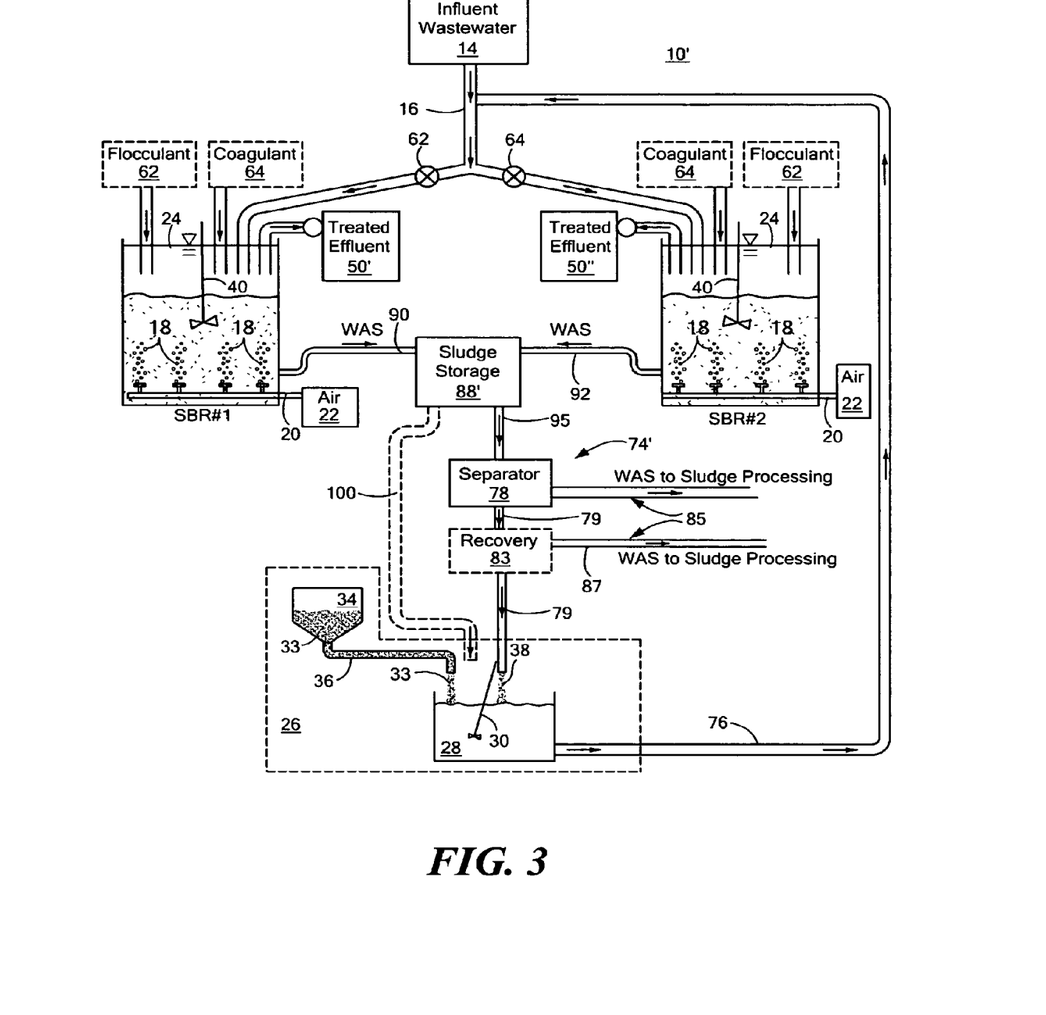
FIG. 3 is a schematic block diagram showing another embodiment of the SBR system for treating wastewater of this invention.

System 10', FIG. 3, where like parts have been given like numbers, includes at least two SBRs 12' and 12". In this example, SBR 12' is filled with influent wastewater 14 by line 16 by opening valve 62 and closing valve 64. Once SBR 12' is filled, valve 62 is closed and valve 64 is open. SBR 12" is then similarly filled with influent wastewater 14. Thus, system 10' allows a continuous flow of influent wastewater 14 to either SBR 12' or SBR 12" for continuous operation. System 10 is not limited to two SBRs, as any number of SBRs may be utilized to accommodate the flow rate of influent wastewater 14. In one example, after SBR 12' is filled and SBR 12" is in the fill phase, SBR 12' undergoes the react, settle, and decant phases. Similarly, when SBR 12' is in the fill phase, SBR 12" typically undergoes the react, settle, and decant phases.

System 10' may include sludge storage tank 88' which receives some of the settled sludge from SBR 12' via line 90 and some of the settled sludge from SBR 12" via line 92 during or after the decant phase in each respective SBR 12', 12".

System 10' also includes weighting agent impregnation subsystem 26' which, in this embodiment, is located downstream from sludge storage tank 88'. In this example, impregnation tank 28 and mixer 30 receives settled sludge from sludge storage tank 88' by line 100. Impregnation tank 28 also preferably receives virgin weighting agent 33, e.g., from feed hopper 34 by line 36, and/or recycled weighting agent 38 from weighting agent recovery subsystem 74. Mixer 30 mixes the settled sludge and virgin weighting agent 33 and/or the recycled weighting agent 38 in impregnation tank 28 to impregnate the weighting agent into the biological flocs suspended in the settled sludge to form weighted biological flocs, similarly as discussed with reference to FIG. 1.

System 10', FIG. 3, also includes weighting agent recovery subsystem 74' which receives the sludge from sludge storage tank 88'. Weighting agent recovery subsystem 74' preferably includes separator 78, which in this embodiment, is located downstream from sludge storage tank 88' and upstream from weighting agent impregnation subsystem 26. Separator 78 recovers the weighting agent from the weighted biological flocs in the settled sludge in line 95 from sludge storage tank 88' and reintroduces (recycles) the recovered weighting agent 38 to weighting agent impregnation subsystem 26 via line 79. Weighting agent recovery subsystem 74' may include recovery subsystem 83, FIG. 3, e.g., a wet drum magnetic separator or similar type device, which is typically located downstream from separator 78.

In one exemplary operation of system 10', valve 62 is opened and valve 64 is closed to fill SBR 12' (SBR #1) with influent wastewater 14. Then valve 62 is closed and valve 64 is opened to fill SBR 12" (SBR #2). While SBR 12" is being filled, SBR 12' undergoes the react, settle, and decant phases as discussed above. During or after the decant phase in SBR 12', excess (waste) settled sludge at the bottom of SBR 12' is pumped to sludge storage tank 88' via line 90. Some of the settled sludge in sludge storage tank 88 may be directed via line 100 to weighting agent impregnation tank 28 of weighting agent impregnation subsystem 26' and some of the sludge in sludge storage tank 88 may be directed to separator 78 via line 95. Weighting agent impregnation subsystem 26' impregnates virgin weighting agent 33 and/or recovered weighting agent 38 into the biological flocs in the settled sludge in impregnation tank 28 using mixer 30.

Weighting agent recovery subsystem 74' then sends the settled sludge having weighted biological flocs therein to line 16 via line 76. At this point, SBR 12" (SBR #2) has been filled so valve 62 is opened and valve 64 is closed so that the mixture of influent wastewater 14 and the settled sludge having weighted biological flocs therein is directed to fill SBR 12' (SBR #1). At this point, SBR 12" is undergoing the react, settle, and decant phases. Similar, as discussed above, during or after decant phase, some of the settled sludge at the bottom of SBR 12" is pumped to sludge storage tank 88' via line 92. This settled sludge is processed by weighting agent impregnation subsystem 26' as discussed above to form weighted biological flocs in the settled sludge in impregnation mixing tank 28. Weighting agent recovery subsystem 74' then directs the settled sludge with the weighted biological flocs therein to line 16, as discussed above. Valve 62 is closed and valve 64 is open to fill SBR 12" with the mixture of influent wastewater and settled sludge having weighted biological flocs. The process of switching between SBR 12' and SBR 12" continues when ever system 10' is operational.

Similar as discussed above, the weighted biological flocs introduced to mixed liquor 24 in SBRs 12', 12" settle faster to reduce the time needed for their respective settling phases. This increases the capacity system 10' to treat wastewater and alleviates the problems associated with conventional SBR systems discussed above and provides a cleaner treated effluent 50', 50".

Similar as discussed above, flocculant 62, FIG. 3, may be added to mixed liquor 24 in SBR 12', 12" to enhance settling and thickening of the weighted biological flocs suspended in mixed liquor 24 in SBR 12 and establishes agglomeration of non-impregnated biological flocs and/or partially impregnated biological flocs with the weighted biological flocs in SBR 12', 12". The weighted biological flocs also provide a cleaner treated effluent, with fewer suspended solids and related contaminants.

Coagulant 64 may also be added to SBR 12', 12" for removing phosphorus from mixed liquor 24 by precipitation and/or coagulation, as known by those skilled in the art. Mixer 40 and/or air bubbles 18 may be used to maintain biological flocs 23 in suspension in mixed liquor 24 and to mix the flocculant and/or the coagulant with mixed liquor 24 in SBR 12', 12".

In another embodiment, weighting agent impregnation subsystem 26' may receive mixed liquor 24 directly from SBR 12' or directly from SBR 12". Similar as discussed above with reference to FIG. 1, weighting agent impregnation tank 28 mixes mixed liquor 24 and virgin weighting agent 33 and/or recovered weighting agent 38 from separator 78 and/or recovery subsystem 83 to impregnate the weighting agent into biological flocs suspended in the mixed liquor to form weighted biological flocs. The weighted biological flocs are then sent back to SBR 12' or to SBR 12".

Thus, system 10' can impregnate the biological flocs either by impregnating the biological flocs in the mixed liquor in SBRs 12', 12", or by impregnating the biological flocs in the settled sludge output by SBRs 12', 12", or using a combination of both methods.

Figure 4:
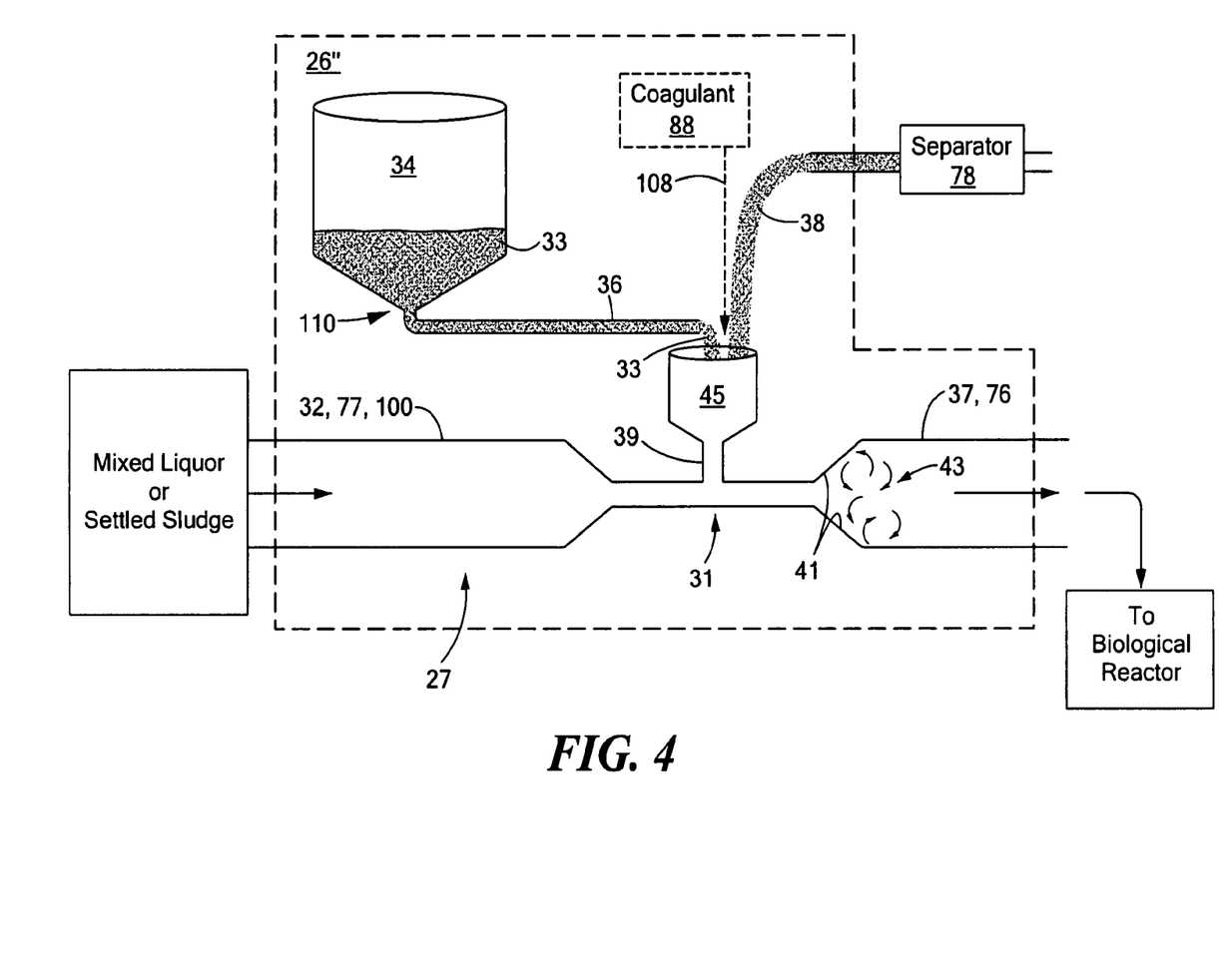
FIG. 4 is a schematic side-view of another embodiment of the impregnation subsystem shown in FIGS. 1 and 3.

System 10, FIG. 1, and/or system 10', FIG. 3, may also utilize weighting agent impregnation subsystem 26", FIG. 4, where like parts have been given like numbers. Weighting agent impregnation subsystem 26" includes venturi mixer/eductor 27 having nozzle 31 and funnel 45 which receives virgin weighting agent 33, e.g., from tank 34 by line 36, and/or recycled weighting agent 38 from separator 78 or recovery subsystem 83, FIGS. 1 and 3. Venturi mixer/eductor 27 preferably receives mixed liquor by line 32, FIG. 1, or settled sludge by line 77, or settled sludge by line 100, FIG. 3.

In operation, the velocity of mixed liquor in line 32, FIG. 1, or the settled sludge in line 77, or line 100, FIG. 3, is increased through nozzle 31, FIG. 4. Virgin weighting agent 33 and/or recycled weighting agent 38 in funnel 45 enters nozzle 31 by line 39 and travels downstream to line 37. The widening of line 37 at 41 induces intimate mixing and entrainment, as shown at 43. This impregnates the virgin and/or recycled weighting agent into the biological flocs to form weighted biological flocs. The weighted biological flocs are then returned to SBR 12, FIG. 1, by line 37, or SBR 12', 12", FIG. 3, by lines 76 and 16.

Figure 5A:
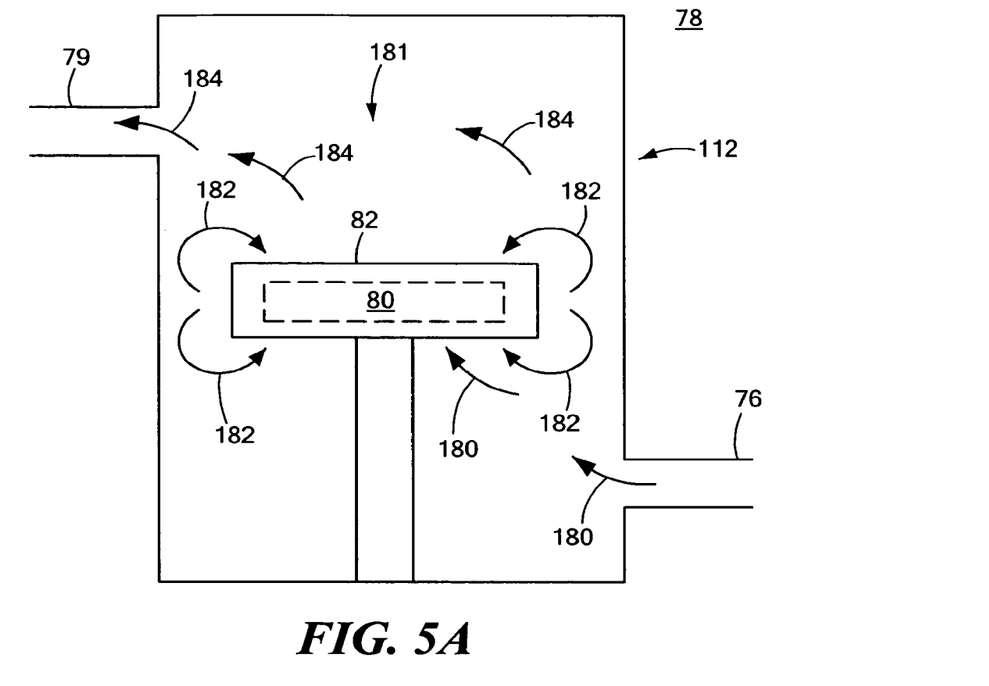
FIG. 5A is a schematic side-view of one embodiment of the separator shown in FIGS. 1 and 3.

In one design, separator subsystem 78, FIGS. 1 and 3 may be configured as shear mill 112, FIG. 5A, which shears the sludge in line 76, FIG. 1, or line 95, FIG. 3, to separate the weighting agent from the weighted biological flocs. Shear mill 112 ideally includes rotor 80 and stator 82. In operation, the settled sludge in line 76, FIG. 1 or 95, FIG. 3, enters shear mill 112 and flows in the direction of arrows 180 and enters rotor 80 and then stator 82. Shear mill 112 is designed such that there is a close tolerance between rotor 80, FIG. 5B and stator 82, as shown at 93. Rotor 80 is preferably driven at high rotational speeds, e.g., greater than about 1,000 r.p.m., to form a mixture of weighting agent and obliterated flocs in area 181, FIG. 5A, of shear mill 112. The mixture of weighting agent and obliterated flocs exits shear mill 112 by line 79, as shown by arrows 184. FIG. 5C shows in further detail the structure of one embodiment of shear mill 112. Preferably, rotor 80, FIGS. 5A-5C, and/or stator 82 includes slots which function as a centrifugal pump to draw the settled sludge from above and below rotor 80 and stator 82, as shown by paths 182, FIG. 5A, and then hurl the materials off the slot tips at a very high speed to break the weighted biological flocs into the mixture of weighting agent and obliterated flocs. For example, rotor 80, FIG. 5B, may include slots 186, and stator 82 may include slots 188. Slots 186 in rotor 80 and/or slots 188 in stator 82 are preferably optimized to increase shear energy to efficiently separate the weighting agent from the weighted biological flocs. The shear developed by rotor 80 and stator 82 depends on the width of slots 186 and 188, the tolerance between rotor 80 and stator 82, and the rotor tip speed. The result is shear mill 112 provides a shearing effect which effectively and efficiently separates the weighting agent from the weighted biological flocs to facilitate recovery of the weighting agent.

Figure 6:
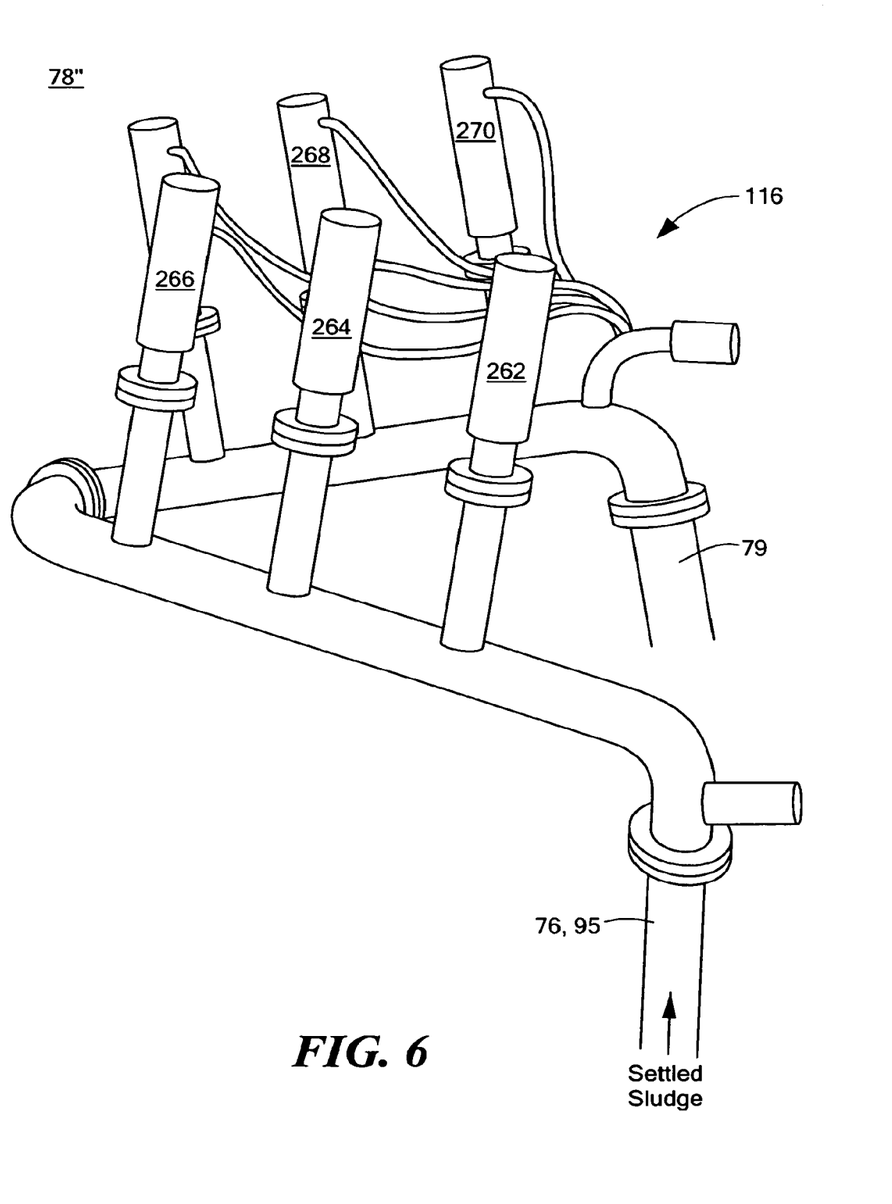
FIG. 6 is a three-dimensional front-view of another embodiment of the separator shown in FIGS. 1 and 3.

In another design, separator subsystem 78, FIGS. 1 and 3, may be configured as ultrasonic separator 116, FIG. 6, where like parts have been given like numbers. Ultrasonic separator 116 typically includes one or more ultrasonic transducers, e.g., ultrasonic transducer 262, 264, 266, 268, and/or 270, available from Hielscher Ultrasonics GmbH, Stuttgart, Germany, which generates fluctuations of pressure and cavitation in the settled sludge in line 76, FIG. 1 or line 95, FIG. 3. This results in microturbulences that produce a shearing effect to create a mixture of weighting agent and obliterated flocs to effectively separate the weighting agent from the weighted biological flocs in the settled sludge. The resulting mixture of weighting agent and obliterated flocs exits ultrasonic separator 116 by line 79.

Figure 7:
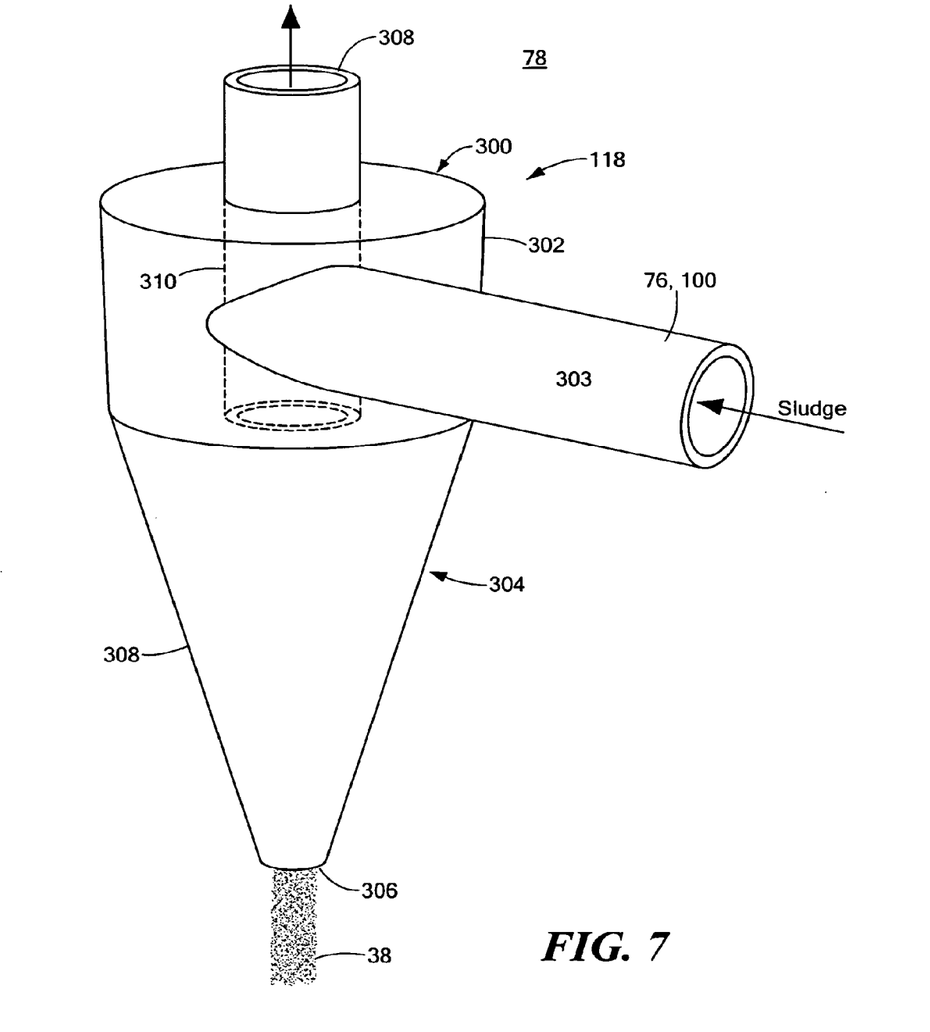
FIG. 7 is a three-dimensional front-view of yet another embodiment of the separator shown in FIG. 1.

In yet another design, separator subsystem 78, FIG. 7, where like parts have been given like numbers, may be configured as centrifugal separator 118. Centrifugal separator 114 typically includes cylindrical section 302 located at the top of hydrocyclone 300 and conical base 304 located below section 302. The settled sludge in line 76, FIG. 1 or line 100, FIG. 3, is fed tangentially into cylindrical section 302 via port 303. Smaller exit port 306 (underflow or reject port) is located at the bottom of conical section 304 and larger exit port 308 (overflow or accept port) is located at the top of cylindrical section 302.

In operation, the centrifugal force created by the tangential feed of the sludge by port 303 causes the denser weighting agent to be separated from the biological flocs in the settled sludge. The separated weighting agent is expelled against wall 308 of conical section 304 and exits at port 306. This effectively separates the weighting agent from the weighted biological flocs. The recovered weighting agent 38 exits via port 306 and may be deposited to weighting agent impregnation system 26, 26', or 26", FIGS. 1, 3, and 4. The less dense biological flocs remain in the sludge and exit via port 308 through tube 310 extending slightly into the body of the center of centrifugal separator 118.

Although as discussed above, separator subsystem 78 may be configured as a shear mill, an ultrasonic separator, or a centrifugal separator, this is not a necessary limitation of this invention. In other designs, separator subsystem 78 may be configured as a tubular bowl, a chamber bowl, an imperforate basket, a disk stack separator, and the like, as known by those skilled in the art.

Figure 5B:
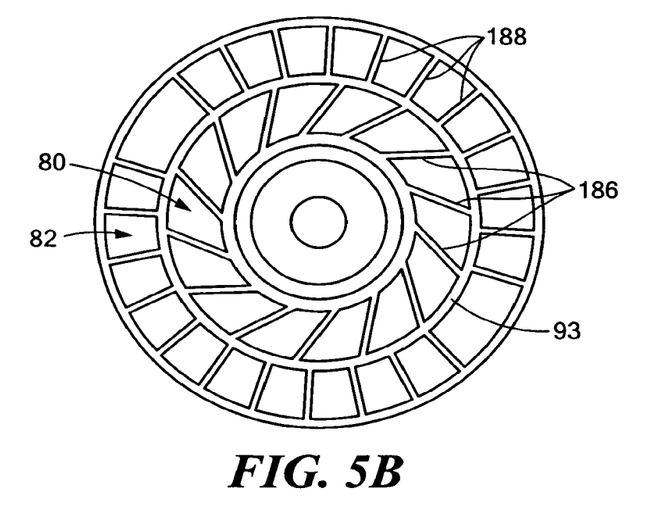
FIG. 5B is a schematic top view showing one example of slots in the rotor and stator of the shear mill shown in FIG. 5A.
Figure 5C:
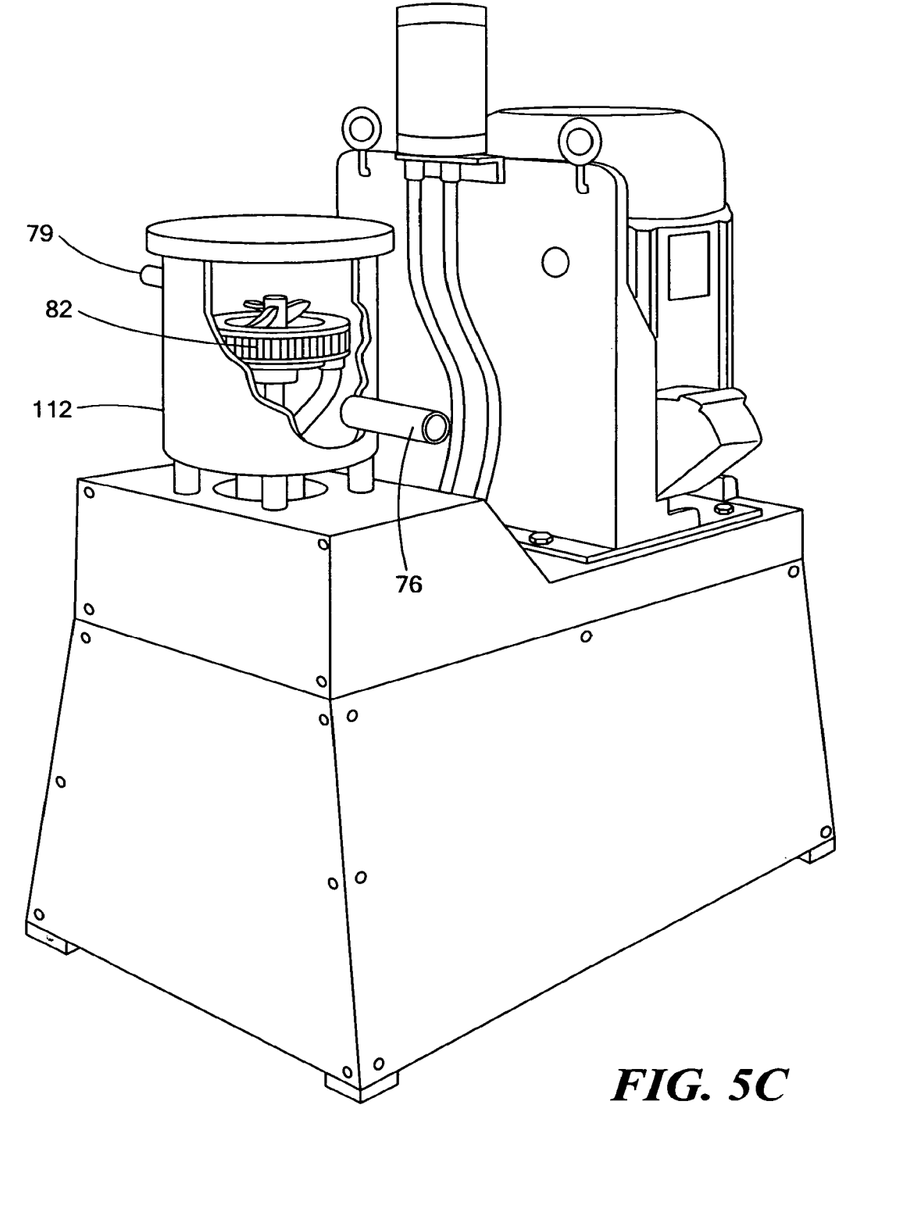
FIG. 5C is a three-dimensional view of one embodiment of the shear mill in FIG. 5A.

In the example above where a separator 78, FIGS. 5A-5C, is configured as shear mill 112 to create the mixture of weighting agent and obliterated biological flocs, a wet drum magnetic separator or centrifugal separator 118, FIG. 7, may be used to recover the weighting agent therefrom e.g., recycled weighting agent 38, FIGS. 1 and 3, delivered to weighting agent impregnation subsystem 26 by line 79 and/or recycled weighting agent 38, FIG. 7, delivered to weighting agent impregnation subsystem 26 via port 306.

In the example where separator subsystem 78, FIG. 6, is configured as an ultrasonic separator 116 to create the mixture of weighting agent and obliterated biological flocs, a wet drum magnetic separator or centrifugal separator 118, FIG. 7, may be used to recover the weighting agent therefrom, e.g., recycled weighting agent 38, FIGS. 1 and 3, delivered to weighting agent impregnation subsystem 26 by line 79 and/or recycled weighting agent 38, FIG. 7, delivered to weighting agent impregnation subsystem 26 via port 306.

The result of recovering and recycling the weighting agent as discussed above with reference to FIGS. 5A-7 significantly reduces the operating costs of wastewater treatment system 10.

System 10, 10', FIGS. 1 and 3, may also include wasting subsystem 85 coupled to separator 78 and/or recovery subsystem 85 which wastes the remaining settled sludge output by separator subsystem 78 and/or recovery subsystem 83 to control the population of the microorganisms in mixed liquor 24 in SBR 12, FIG. 1, or SBR 12', 12", FIG. 3. The capacity of system 10, 10', FIGS. 1 and 3 to process wastewater 14 may be increased by increasing the concentration of the mixed liquor suspended solids (MLSS) in SBR 12, FIG. 1, or SBR 12', 12", FIG. 3, by reducing the amount of settled sludge wasted by wasting subsystem 85. Increasing the concentration of the MLSS may reduce the duration of the react phase. The amount of settled sludge wasted by wasting subsystem 85 may also be reduced to increase the concentration of MLSS to enhance nitrification and/or de-nitrification of ammonia in mixed liquor 24. The nitrification process may also be further enhanced by increasing the amount of dissolved oxygen introduced to SBR 12, 12', 12" via bubbles 18.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A ballasted sequencing batch reactor system for treating wastewater comprising:
   one or more sequencing batch reactors fluidly connected to a source of wastewater, the one or more sequencing batch reactors comprising a treated effluent outlet and a waste activated sludge outlet;
   a weighting agent impregnation subsystem fluidly connected to a biological flocs outlet of the one or more sequencing batch reactors and comprising a weighted biological flocs outlet fluidly connected to the one or more sequencing batch reactors, the weighting agent impregnation subsystem configured to mix suspended biological flocs and weighting agent to form weighted biological flocs;
   a weighting agent recovery subsystem fluidly connected to the waste activated sludge outlet of the one or more sequencing batch reactors and an inlet of the weighting agent impregnation subsystem, the weighting agent recovery subsystem configured to recover weighting agent from the weighted biological flocs of a waste activated sludge and reintroduce the recovered weighting agent to the weighting agent impregnation subsystem.

2. The system of claim 1, further comprising a sludge storage tank configured to receive settled sludge comprising settled weighted biological flocs from the waste activated sludge outlet of the one or more sequencing batch reactors, store the settled sludge therein, and regulate the flow of the settled sludge to the weighting agent recovery subsystem.

3. The system of claim 1, wherein the weighting agent recovery subsystem comprises a separator subsystem for separating the weighting agent from the settled weighted biological flocs, the separator subsystem comprising at least one of a shear mill, a centrifugal separator, an ultrasonic separator and a wet drum magnetic separator.

4. The system of claim 1, wherein the one or more sequencing batch reactors are configured to decant effluent from settled sludge comprising settled weighted biological flocs to provide a treated effluent.

5. The system of claim 1, further comprising a wasting subsystem for wasting settled sludge comprising settled weighted biological flocs from the weighting agent recovery subsystem to control a population of microorganisms in a mixed liquor in the one or more sequencing batch reactors.

6. The system of claim 1, wherein the weighting agent has a particle size less than about 40 μm.

7. The system of claim 1, wherein the weighting agent comprises magnetite.

8. A method for treating wastewater using one or more sequencing batch reactors, the method comprising:
introducing influent wastewater to the one or more sequencing batch reactors to form suspended biological flocs;
introducing a portion of the suspended biological flocs into a weighting agent impregnation subsystem to impregnate the weighting agent into the suspended biological flocs and to form weighted biological flocs;
introducing the weighted biological flocs from the weighting agent impregnation subsystem to the one or more sequencing batch reactors; and
introducing at least a portion of a settled sludge comprising settled weighted biological flocs to a weighting agent recovery system to recover weighting agent from the settled weighted biological flocs.

9. The method of claim 8, further comprising introducing a recovered weighting agent from the weighting agent recovery system to the weighting agent impregnation subsystem.

10. The method of claim 8, wherein the weighting agent has a particle size less than about 40 μm.

11. The method of claim 8, further comprising introducing dissolved oxygen to a population of microorganisms to promote growth of suspended biological flocs in a mixed liquor defined by a concentration of mixed liquor suspended solids.

12. The method of claim 11, further comprising introducing a flocculant to the mixed liquor in the one or more sequencing batch reactors to enhance settling and thickening of the weighted biological flocs and to establish agglomeration of non-impregnated biological flocs and/or partially impregnated biological flocs with the weighted biological flocs.

13. The method of claim 11, further comprising separating and collecting the weighted biological flocs from the mixed liquor in the one or more sequencing batch reactors to provide a secondary effluent and the settled sludge.

14. The method of claim 13, further comprising recycling the settled sludge.

15. The method of claim 13, further comprising decanting the effluent from the settled sludge in the one or more sequencing batch reactors to provide a treated effluent.

16. The method of claim 13, further comprising wasting a portion of the settled sludge using a wasting subsystem to control the population of the microorganisms in the mixed liquor.

17. The method of claim 8, further comprising wasting settled sludge from the weighting agent recovery subsystem to control a population of microorganisms in a mixed liquor in the one or more sequencing batch reactors.

18. The method of claim 17, further comprising increasing the capacity of the system by increasing the concentration of the mixed liquor in the one or more sequencing batch reactors by reducing the amount of settled sludge wasted by a wasting subsystem.

19. The method of claim 17, further comprising reducing the amount of settled sludge wasted by the wasting subsystem to increase the concentration of mixed liquor suspended solids which enhances nitrification and/or de-nitrification of ammonia in the mixed liquid.

* * * * *